(12) United States Patent
Yiu et al.

(10) Patent No.: US 6,514,027 B1
(45) Date of Patent: Feb. 4, 2003

(54) ATTACHMENT CLIP FOR A DOOR LATCH ASSEMBLY

(75) Inventors: Arnold Yiu, Thornhill (CA); Adrian Mihail, Richmond Hill (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 09/913,232

(22) PCT Filed: Feb. 16, 2000

(86) PCT No.: PCT/CA00/00149
§ 371 (c)(1),
(2), (4) Date: Aug. 10, 2001

(87) PCT Pub. No.: WO00/49254
PCT Pub. Date: Aug. 24, 2000

Related U.S. Application Data

(60) Provisional application No. 60/120,149, filed on Feb. 16, 1999.

(51) Int. Cl.[7] .................................................. F16B 37/08
(52) U.S. Cl. ........................................ 411/433; 411/540
(58) Field of Search ................................. 411/433, 437, 411/540

(56) References Cited

U.S. PATENT DOCUMENTS

| | | | | |
|---|---|---|---|---|
| 5,039,266 A | * | 8/1991 | Nagayoshi et al. | 411/433 |
| 6,050,766 A | * | 4/2000 | Kies et al. | 411/433 |
| 6,338,602 B1 | * | 1/2002 | Gombert | 411/339 |

FOREIGN PATENT DOCUMENTS

| | | | | |
|---|---|---|---|---|
| FR | 0561892 | * | 10/1923 | 411/433 |
| FR | 2640336 A1 | * | 6/1990 | F16B/37/10 |
| JP | 0256908 | * | 10/1990 | 411/433 |

* cited by examiner

Primary Examiner—Flemming Saether
Assistant Examiner—Jori Schiffman
(74) Attorney, Agent, or Firm—Clark Hill PLC

(57) ABSTRACT

An attachment clip (200) for a vehicle door latch assembly includes a first clip portion (102) with a first alignment member (118), a second clip portion (104) with a first alignment channel (122), and a resilient hinge (206) extending between the clip portions so as to allow the clip portions to close around an attachment member (40). The resilient hinge includes an alignment boss (228) integrally molded on the hinge and being disposed for engagement with one of the clip portions for forcing engagement upon closing of the clip portions.

7 Claims, 5 Drawing Sheets

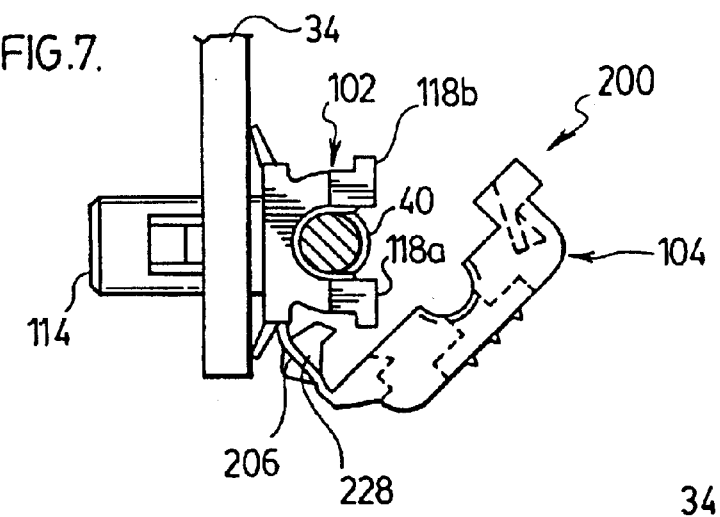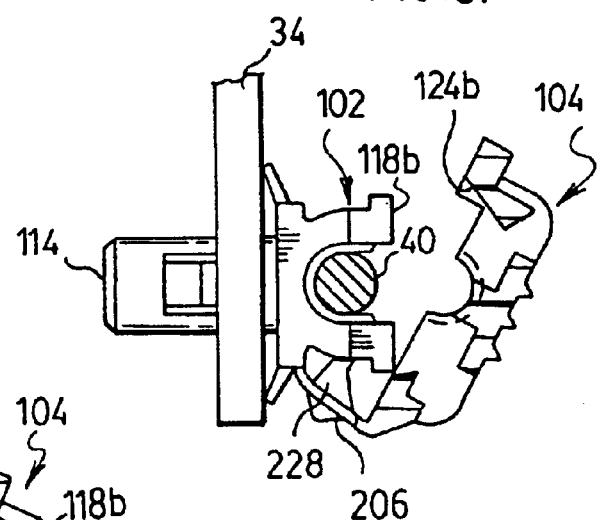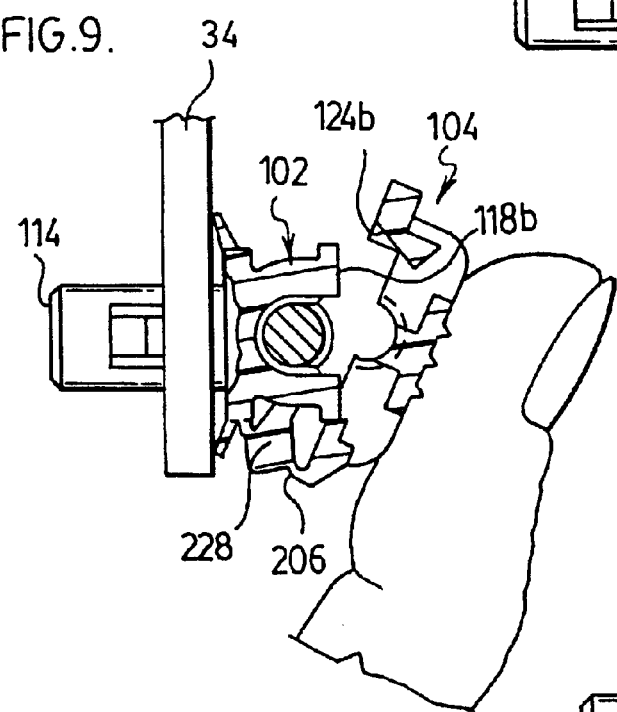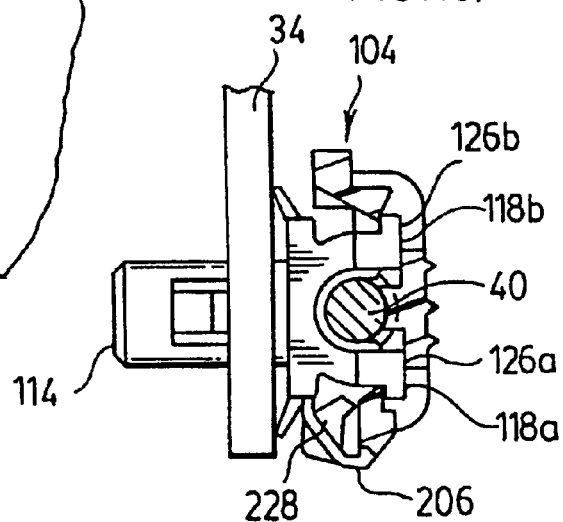

ATTACHMENT CLIP FOR A DOOR LATCH ASSEMBLY

This application is a 371 of PCT/CA/00/00149 filed on Feb. 16, 2000, which claims the benefit of U.S. Provisional Application No. 60/120,149 filed on Feb. 16, 1999.

FIELD OF THE INVENTION

The present invention generally relates to fasteners, and more specifically relates to an attachment clip for interconnecting components of a door latch assembly, such as in an automotive vehicle.

BACKGROUND OF THE INVENTION

Attachment clips for securing parts to automotive vehicles are well known. In fact, many types of specialized clips have been developed to facilitate the vehicle assembly process. These clips are specially designed to securely retain a part such as a tie-rod, and are simple to install.

One particular type of attachment clip, commonly known as a "Mazda clip", is an attachment clip used on a cargo van door latch assembly. Typical door latch assemblies include a door handle, a latch and a threaded tie rod connecting the handle to the latch. The attachment clip is mounted to the latch and is the mechanical interface between the tie rod and the latch.

The typical "Mazda clip" includes a base portion attached by a flexible hinge to a cap portion, and can be placed in an open position or locked in closed position. The inner facing surfaces of the cap portion and the base portion each have partial interior threads complementary to the exterior threads of the tie-rod, which cooperate to engage the tie-rod threads when the clip is closed. The clip also has a pair of tabs which extend from the cap portion, and a pair of detents formed in the base portion for receiving the tabs. The detents are configured such that when the cap portion is pressed towards the base portion, the detents engage the tabs to properly align the cap portion with the base portion and to snappingly close the interior threads of the cap and base portions around the threaded rod.

Given that latch assemblies are often located within an enclosed channel in one of the cargo van doors, it will be apparent that such clips are advantageous since they allow an assembly line operator to quickly install the latch assembly by blindly inserting an attachment clip in the channel and then closing the clip around the threaded portion of the tie rod. However, field testing and examination has shown that numerous door latch assemblies, although passing functional testing immediately after installation, are prone to early failure due to misalignment of the base and cap portion of the attachment clip around the tie rod threads. Consequently, there remains a need for an attachment clip which allows a door latch assembly to be reliably installed within the channel of cargo van door, but which does not appreciably increase the cost or the installation time of the latch assembly.

SUMMARY OF THE INVENTION

Accordingly, to the invention, there is provided an attachment clip which addresses the deficiencies of the conventional vehicle door latch attachment clip.

The attachment clip, according to the invention, is configured for securement to an attachment member, and comprises a first clip portion, a second clip portion, and a resilient hinge extending between the clip portions for facilitating relative movement of the clip portions so as to allow the clip portions to close around the attachment member. The first clip portion includes a first alignment member protruding therefrom, and the second clip portion includes a first alignment channel configured for receiving the first alignment member therein for facilitating alignment of the first clip portion with the second clip portion. The resilient hinge includes an alignment tab provided thereon and is disposed for engagement with one of the clip portions for facilitating alignment of the first alignment member with the first alignment channel when the clip portions begin to close around the attachment member.

Preferably, the resilient hinge, the clip portions and the alignment boss are all fabricated from plastic material, with the resilient hinge comprising a flexible plastic strip integrally molded with the clip portions. The alignment boss comprises a rigid plastic alignment boss integrally molded with the flexible plastic strip for imparting rigidity to the strip along a portion thereof for facilitating the alignment of the first alignment leg with the first alignment channel when the clip portions being to close. Also, preferably the alignment boss includes a base portion integrally molded with the plastic strip, an apex portion opposite the base portion, and at least two side walls extending between the base portion and the apex portion, with one of the side walls being shaped for cooperation with one of the clip portions for further facilitating alignment of the first alignment leg with the first alignment channel when the clip portions begin to close.

The attachment clip has an inner side portion and an outer side portion, with the alignment boss and the first alignment leg being disposed adjacent the inner side portion. Also, preferably the first clip portion also includes a second alignment leg protruding therefrom adjacent the outer side portion, and the second clip portion includes a second alignment channel for receiving the second alignment leg therein for facilitating the alignment of the first clip portion with the second clip portion. Consequently, preferably the alignment boss is also shaped for facilitating alignment of the second alignment leg with the second alignment channel subsequent to the alignment of the first alignment leg with the first alignment channel. Typically, the attachment member includes a threaded section, and the clip portions include respective threaded portions disposed between the inner and outer side portions and complementary to the threaded section, with the threaded portions cooperating upon closing of the clip portions for receiving the threaded section therein.

BRIEF DESCRIPTION OF THE DRAWINGS

The preferred embodiment of the present invention will now be described, by way of example only, with reference to the attached drawings, in which like reference numerals identify like elements, and in which:

FIG. 7 is a top view of the attachment clip according to the invention, shown in the open position, with the tie-rod from the door latch assembly shown in FIGS. 1 to 2 inserted therein;

FIG. 8 is a sectional view of the attachment clip according to the invention, shown in a first position intermediate between the open position and the closed position;

FIG. 9 is a sectional view the attachment clip according to the invention, shown in a second position intermediate the open position and the closed position and depicting a thumb engaging the outer portion of the clip; and FIG. 10 is a sectional view the attachment clip according to the invention, shown in the closed position.

DETAILED DESCRIPTION OF THE PREFERRED EMBODIMENT

Before describing the preferred embodiment of the invention, a conventional latching assembly for the rear cargo doors of a van will be described first, followed by a description of a conventional attachment clip for use with such latching assemblies and a description of the attachment clip according to the present invention.

Figure 1:
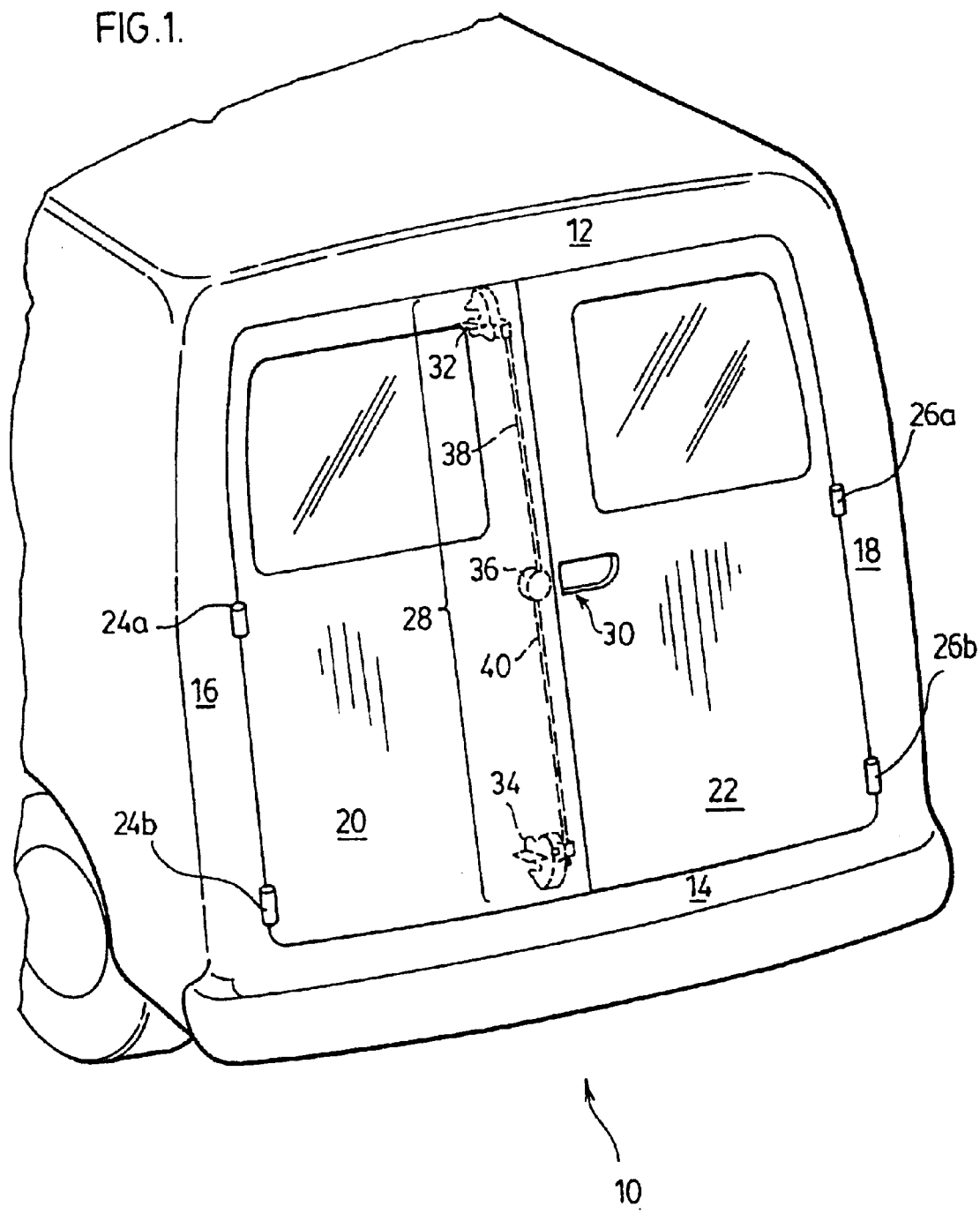
FIG. 1 is a partial perspective view of a pair of rear cargo doors on a van with a door latch assembly shown in dashed lines.

Turning first to FIG. 1, the rear portion of a van 10 is shown having an upper door frame member 12, a lower door frame member 14, a left door pillar 16 extending vertically between the upper and lower door frame members 12, 14, a right door pillar 18 extending vertically between the upper and lower door frame members 12, 14, a left cargo door 20, and a right cargo door 22. The left door 20 is pivotally mounted to the left door pillar 16 by an upper hinge 24a and a lower hinge 24b, while the right door 22 is pivotally mounted to the right door pillar 18 by an upper hinge 26a and a lower hinge 26b. In this specification, terms such as "left", "right", "upper", and "lower" are used for convenience and should not be construed in a limiting sense.

The van 10 also includes a door latch assembly 28 which releasably secures the left door 20 to the upper and lower door frame members 12, 14 against opening. The door latch assembly 28 is mounted in a channel within the interior of the left door 20, and has a latched position in which the left door 20 is closed and an unlatched position in which the left door 20 is free to rotate on the hinges 24. The right door 22 has a handle 30 mounted on the exterior thereof and can be operated to open the right door 22.

The door latch assembly 28 includes an upper door latch 32, a lower door latch 34 substantially identical to the upper door latch 32, a door latch actuator lever 36 operable from the interior of the van 10, an upper tie-rod 38 coupled between the upper door latch 32 and the actuator lever 36, and a lower tie-rod 40 coupled between the lower door latch 34 and the actuator lever 36. The latches 32, 34 engage strikers (not illustrated) mounted on the door frame members 12, 14 respectively when the left door 20 is closed and latched. Conversely, the latches 32, 34 are released from the strikers when the actuator lever 36 is operated.

Figure 2:
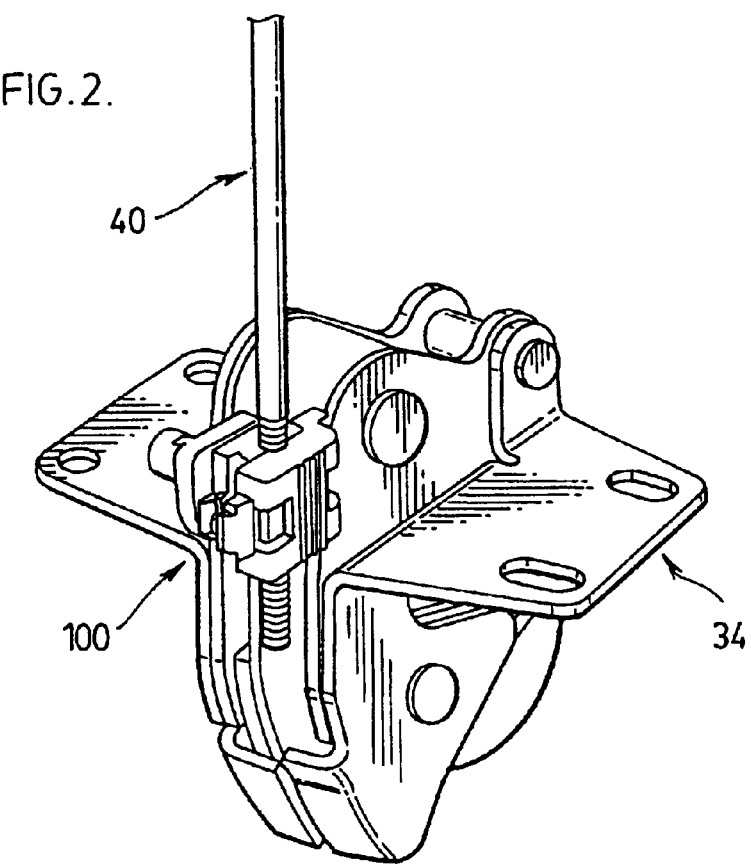
FIG. 2 is a partial perspective view of the lower latch from the door latch assembly shown in FIG. 1.

Referring now to FIG. 2, the lower door latch 34 and the lower tie-rod 40 can be seen in greater detail, including a conventional plastic attachment clip 100 mounted to the lower door latch 34 and securing the lower tic-rod 40 thereto. As will be appreciated, the attachment clip 100 allows the lower tie-rod 40 to open and close the lower door latch 34, when the actuator lever 36 is operated. Also, an identical attachment clip is mounted to the upper door latch 32 and secures the upper tie-rod 38 thereto for allowing the upper door latch 32 to be opened and closed when the actuator lever 36 is operated.

Figure 3:
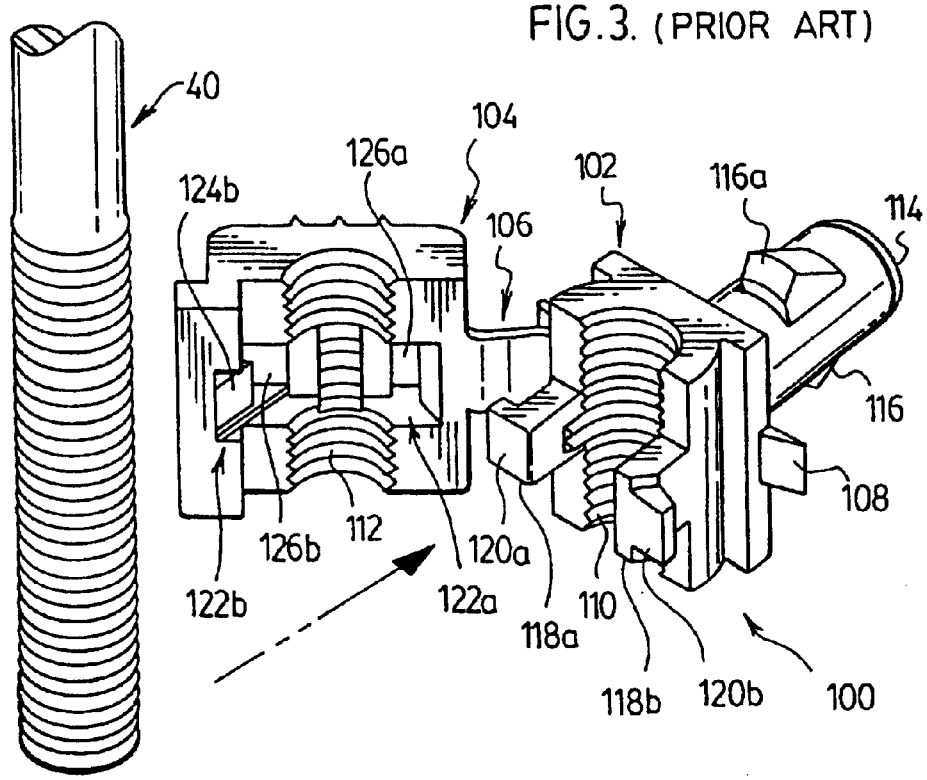
FIG. 3 is an exploded perspective view of a prior art attachment clip and tie-rod from the door latch assembly shown in FIGS. 1 to 2.
Figure 4:
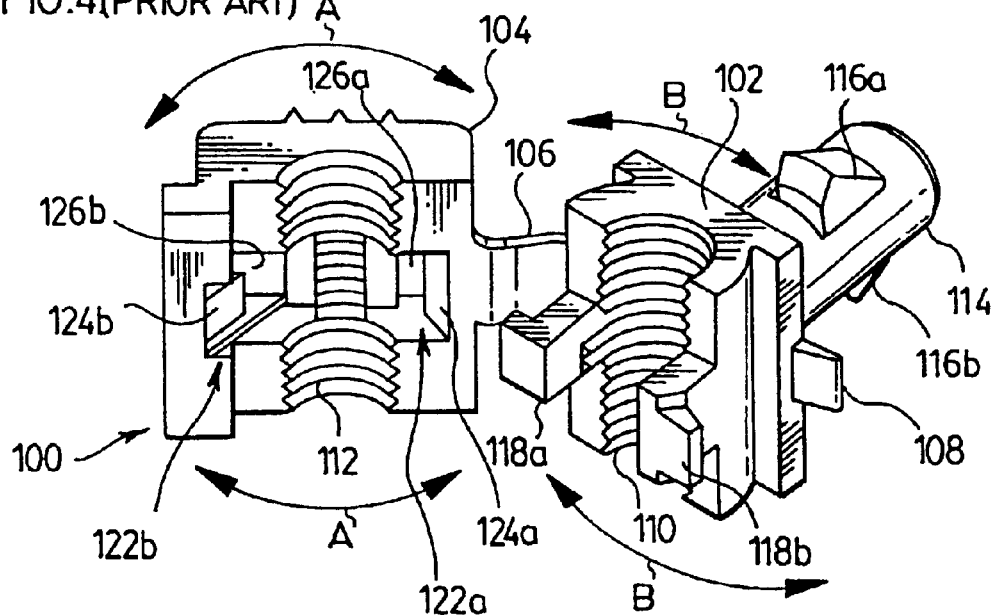
FIG. 4 is a perspective view of the prior art attachment clip shown in FIG. 3.

As shown in FIGS. 3 and 4, the conventional attachment clip 100 includes abase portion 102, a cap portion 104, and a resiliently flexible hinge 106 integrally molded with the base portion 102 and the cap portion 104. The flexible hinge 106 comprises a flexible plastic strip which joins the base portion 102 to the cap portion 104 and allows the base cap portion 104 to be pivoted relative to the base portion 102. The attachment clip 100 also has a first threaded surface 110 provided on the base portion 102, and a second threaded surface 112 provided on the cap portion 104. As will be apparent, the first and second threaded surfaces 110, 112 together define threads which are complementary to a threaded section of the tie-rod 38, 40, and serve to secure the tie-rod 38,40 to the attachment clip 100 between the cap and base portions 102, 104 when the cap portion 104 is closed. The attachment clip 100 also has a cylindrical mounting post 114 extending from the outer surface of the base portion 102 for mounting the attachment clip 100 to the door latch 32, 34, radially-extending limit tabs 108 provided on the base portion 102 for limiting axial movement of the attachment clip relative to the door latch 32, 34, and opposing locking tabs 116a, 116b provided on the mounting post 114 for preventing the attachment clip 100 from becoming detached from the door latch 32, 34.

The base portion 102 includes an inner L-shaped leg 118a disposed adjacent the flexible hinge 106, and an outer L-shaped leg 118b disposed opposite the inner L-shaped leg 118a, with the first threaded surface 110 being disposed between the L-shaped legs 118. As shown in the drawings, the L-shaped legs 118 include feet 120 provided at their respective ends which extend in opposite directions. The cap portion 104 includes an inner channel 122a disposed adjacent the flexible hinge 106 for receiving the inner L-shaped leg 118a therein, and an outer channel 122b disposed opposite the inner channel 122a for receiving the outer L-shaped leg 118b therein, with the second threaded surface 112 being disposed between the channels 122. The inner channel 122a comprises an inner ramp 124a, and an inner detent portion 126a for snappingly receiving the feet 120a of the inner L-shaped leg 118a therein. Similarly, the outer channel 122b comprises an outer ramp 124b, and an outer detent portion 126b for snappingly receiving the feet 120b of the outer L-shaped leg 118b therein.

In operation, tie-rods 38, 40 are inserted into the channel of the left door 20, and an attachment clip 100 is fastened to each door latch 32, 34 by means of the mounting post 114, the limit tabs 108 and the locking tabs 116. The tie-rods 38, 40 are then secured to the door latches 32, 34 by closing the cap and base portions 102, 104 of the attachment clips 100 around the threaded portion of the respective tie-rods 38, 40 by engaging the L-shaped legs 118 in their respective channels 122. However, as shown in FIG. 4, the flexible nature of the hinge 106 permits a range of movement between the base portion 102 and the cap portion 104, as indicated by arrows A, B. The inventors discovered that since the assembly line operator must secure the tie-rod 38, 40 to the attachment clip 100 without being able to visibly inspect the attachment clip 100, this range of movement has allowed for the possibility of the base portion 102 becoming misaligned with the cap portion 104 when the attachment clip 100 is closed around the tie-rod 38, 40, thereby leading to early failure of the attachment clip 100 and the latching assembly 28. For instance, the inventors discovered that the inner L-shaped leg 118a can misalign with the inner ramp 124a during closure, and instead engage the inner face of the cap portion 104. Consequently, the outer L-shaped leg 118b can engage the outer detent 126b, but without the inner L-shaped leg 118a engaging the inner detent 124a.

Figure 5:
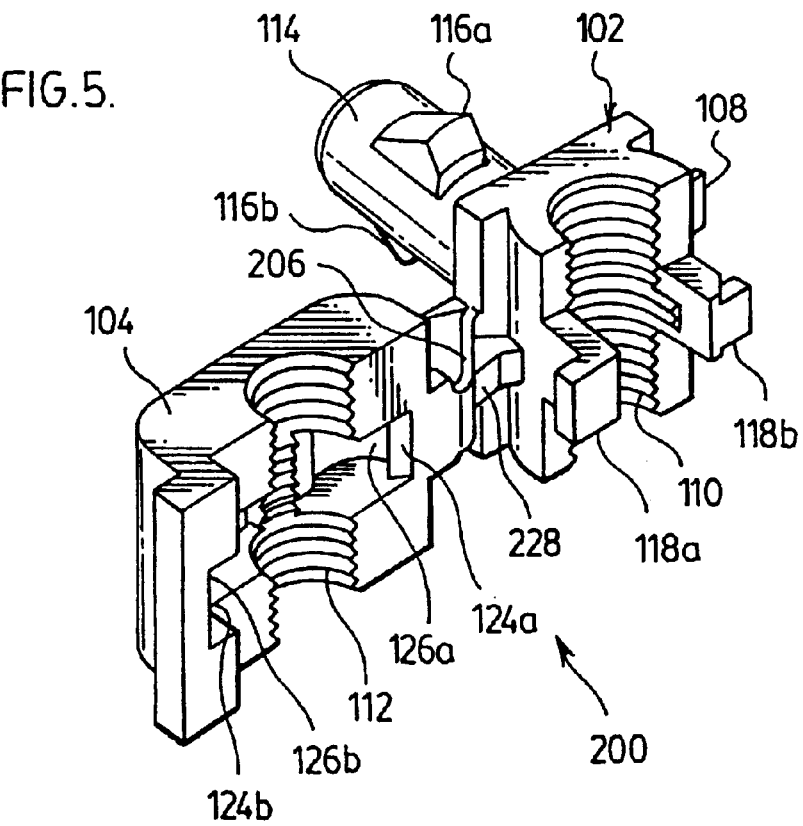
FIG. 5 is a perspective view of an attachment clip in accordance with the present invention.
Figure 6:
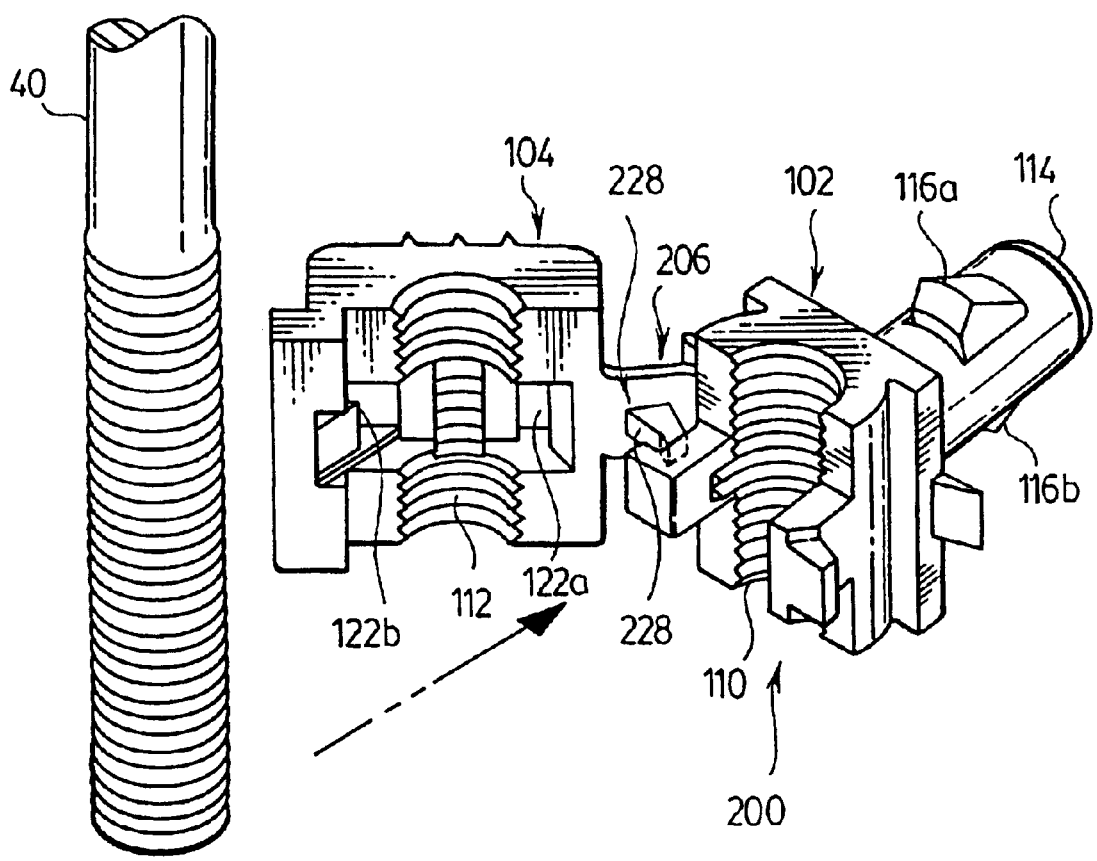
FIG. 6 is an exploded perspective view of the attachment clip shown in FIG. 5, and the tie-rod from the door latch assembly shown in FIGS. 1 to 2.

Turning now to FIGS. 5 and 6, an attachment clip 200, according to the present invention, is shown being similar to the prior art attachment clip 100, described above, in that the attachment clip 200 comprises a plastic base portion 102, a plastic cap portion 104, and a resiliently flexible plastic hinge 206 joining the base portion 102 to the cap portion 104. The attachment clip 200 also has radially-extending limit tabs provided on the base portion 102 for limiting axial movement of the attachment clip 200 relative to the door latch 32, 34, and threaded surfaces 110, 112 for securely receiving the threaded portion of a tie-rod 38,40 therein The attachment clip 200 includes a mounting post 114, which is preferably cylindrical in shape, and opposing locking tabs 116a, 116b provided on the mounting post 114 for securing the attachment clip 200 to the door latch 32, 34.

The base portion 102 of the attachment clip 200 includes an inner L-shaped leg 118a disposed adjacent the inner side of the attachment clip 200, and an outer L-shaped leg 118b disposed opposite the inner L-shaped leg 118a, with the first threaded surface 110 being disposed between the L-shaped legs 118. The cap portion 104 of the attachment clip 200 includes an inner channel 122a disposed adjacent the inner side of the attachment clip 200 for receiving the inner L-shaped leg 118a therein, and an outer channel 122b disposed opposite the inner channel 122a for receiving the outer L-shaped leg 118b therein, with the second threaded surface 112 being disposed between the channels 122. As with the convention attachment clip 100, the inner channel 122a of the attachment clip 200 comprises an inner ramp 124a, and an inner detent portion 126a for snappingly receiving the feet 120a of the inner L-shaped leg 118a therein. Similarly, the outer channel 122b of the attachment clip 200 comprises an outer ramp 124b, and an outer detent portion 126b for snappingly receiving the feet 120b of the outer L-shaped leg 118b therein.

The flexible hinge 206 is integrally molded with the inner side of the base and cap portions 104 and allows the cap portion 104 to be pivoted relative to the base portion 102. Preferably, the flexible hinge 206 comprises a flexible plastic strip whose thickness is reduced slightly immediately adjacent the base portion 102 and the cap portion 104 for facilitating the pivoting movement. The flexible hinge 206 also includes a rigid plastic alignment boss 228 integrally molded therewith. As will be apparent from the following discussion, the alignment boss 228 is sized and positioned in a manner such that the alignment boss 228 engages the inner side of the base portion 104 when the attachment clip 200 starts to close so that the inner L-shaped leg 118a properly aligns with the inner channel 122a and so that the inner L-shaped leg 118a engages the inner channel 122a prior to engagement of the outer L-shaped leg 118b with the outer channel 122b. To facilitate said alignment of the inner L-shaped leg 118a and said alignment of the outer L-shaped leg 118b, preferably the alignment boss 228 has a shark-fin shape, in that it includes a base portion integral with the flexible hinge 206, an apex portion opposite the base portion, and side walls extending between the base portion and the apex portion, with one of the side walls having a slightly arcuate shape for engagement with the base portion 102 when the attachment clip 200 starts to close. Also, the alignment boss 228 imparts a degree of rigidity to the flexible hinge 206 to limit the range of lateral movement of the cap portion 104 relative to the base portion 102 so as to further facilitate said alignment of the inner L-shaped leg 118a and said alignment of the outer L-shaped leg 118b. Consequently, the assembly line operator is able to secure the tie-rod 38, 40 to the door latches 32, 34 without having to visibly inspect the attachment clip 200.

The operation of the attachment clip 200 will now be described with reference to FIGS. 7 to 10. Turning first to FIG. 7, the attachment clip 200 is shown in the open position, with the tie-rod 38 retained within the first threaded surface 110 of the base portion 102. Pressure is then applied to the cap portion 104 so as to pivot the cap portion 104 about the resilient hinge 206 towards the base portion 102 so as to close the attachment clip 200. As shown in FIGS. 8 and 9, as the cap portion 104 pivots towards the base portion 102, the alignment boss 228 abuts against the exterior of the base portion 102 so that the inner L-shaped leg 118a aligns with the inner ramp 124a. The alignment boss 228 also prevents the outer L-shaped leg 118b from aligning with the outer ramp 124b until the inner L-shaped leg 118a aligns with the inner ramp 124a, and prevents the outer L-shaped leg 118b from engaging the outer detent 126b until the inner L-shaped leg 118a engages the inner detent 126a As further pressure is applied to the cap portion 104, the cap portion 104 continues to pivot towards the base portion 102 until the attachment clip 200 is fully closed, as shown in FIG. 10, in which position the inner detent 126a snappingly engages the inner L-shaped leg 118a and the outer detent 126b snappingly engages the outer L-shaped leg 118b. In this manner, the alignment boss 228 assists in the proper alignment of the cap portion 104 with the base portion 102 as the cap portion 104 is moved from the open position to the closed position.

It will be apparent from the foregoing discussion that the present invention provides a novel attachment clip for a vehicle door latch assembly, which incorporates a boss projecting from the hinge of the clip that assists in the proper alignment of the two portions of the clip. However, it will be understood by persons skilled in the art that the present invention can be applied to other types of hinged clips for retaining and securing other types parts, and that the exact configuration of feet, receptacles and interior surfaces of the clip and the boss can be modified without departing from the scope of the present invention. It will be also apparent that, while a preferred embodiment of the present invention is described herein, certain variations and modifications will occur to those of ordinary skill in the art and should not be considered as departing from the scope of the invention, as defined by the appended claims.

We claim:

1. An attachment clip for securement to an attachment member, comprising:

a first clip portion including a first alignment leg protruding therefrom;

a second clip portion including a first alignment channel configured for receiving the first alignment leg therein facilitating alignment of the first clip portion with the second clip portion, one of the clip portions includes a second alignment leg protruding therefrom, the other of the clip portions includes a second alignment channel for receiving the second alignment leg therein;

a resilient hinge extending between and interconnecting the clip portions for facilitating relative pivotal movement of the clip portions for closing the clip portions around the attachment member, the resilient hinge and the clip portions are integrally molded from a plastic material; and an alignment boss integrally molded on the resilient hinge, the alignment boss being disposed for engagement with one of the clip portions for forcing engagement of the first alignment leg with the first alignment channel before engagement of the second alignment leg with the second alignment channel upon said pivotal closing of the clip portions.

2. The attachment clip according to claim 1, wherein the alignment boss includes a base portion secured to the resilient hinge, and at least two side walls extending from the base portion, one of the side walls being arcuately shaped for cooperation with the one clip portion.

3. The attachment clip according to claim 2, wherein the alignment boss includes an apex portion opposite the base portion for abutting engagement with the first clip portion, the side walls extending from the base portion towards the apex portion.

4. The attachment clip according to any of claims 1 to 3, wherein the resilient hinge comprises a flexible strip, and the alignment boss is relatively rigid for imparting rigidity to the resilient hinge along a portion thereof.

5. The attachment clip according to claim 4, wherein the first and second clip portions each include an inner side portion and an outer side portion, the alignment boss and the first alignment leg being disposed adjacent the inner side portions, the second alignment leg being disposed adjacent the outer side portions.

6. The attachment clip according to claim 5, wherein the attachment member includes a threaded section, and the first and second clip portions each include a threaded portion disposed between the respective inner and outer side portion and complementary to the threaded section, upon said closing the threaded portions cooperating for receiving the threaded section therein.

7. The attachment clip according to claims 1 to 3, wherein each of the first and second alignment channels include a ramp and a detent and each of said fist alignment leg and said second alignment leg has a foot which snappingly engages a respective detent to close said attachment clip.

* * * * *

UNITED STATES PATENT AND TRADEMARK OFFICE
CERTIFICATE OF CORRECTION

PATENT NO. : 6,514,027 B1
DATED : February 4, 2003
INVENTOR(S) : Yiu et al.

It is certified that error appears in the above-identified patent and that said Letters Patent is hereby corrected as shown below:

Column 1,
Line 30, insert -- a -- between "in" and "closed" to read "in a closed".
Line 55, insert -- the -- between "of" and "cargo".

Column 3,
Lines 8 and 12, insert -- of -- between "view" and "the".

Column 4,
Line 2, delete "abase" and insert -- a base -- therefor.

Column 6,
Line 34, insert -- of -- between "types" and "parts".

Column 8,
Line 7, delete "portion" and insert -- portions -- therefor.
Line 13, delete "fist" and insert -- first -- therefor.
Line 13, delete "said" and insert -- the -- to read "each of the".
Line 13, delete "said" and insert -- the -- to read "and the".

Signed and Sealed this

Twenty-second Day of April, 2003

JAMES E. ROGAN
*Director of the United States Patent and Trademark Office*